(12) United States Patent
Sakamoto (10) Patent No.: US 12,299,199 B2
(45) Date of Patent: May 13, 2025

(54) LOW-POWER SALIENT HAPTICS

(71) Applicant: Apple Inc., Cupertino, CA (US)

(72) Inventor: Nicholas Y. Sakamoto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 18/122,543

(22) Filed: Mar. 16, 2023

(65) Prior Publication Data
US 2024/0310915 A1     Sep. 19, 2024

Related U.S. Application Data (60) Provisional application No. 63/343,812, filed on May 19, 2022.

(51) Int. Cl.
   *G06F 3/01*         (2006.01)
(52) U.S. Cl.
   CPC .................................. *G06F 3/016* (2013.01)
(58) Field of Classification Search
   CPC ........................................................ G06F 3/016
   See application file for complete search history.

(56) References Cited

U.S. PATENT DOCUMENTS

| | | | |
|---|---|---|---|
| 6,993,363 B1 * | 1/2006 | Hsu | H04M 1/667 |
| | | | 455/3.06 |
| 11,113,686 B1 * | 9/2021 | Ellis | G06Q 30/0639 |
| 2016/0041597 A1 * | 2/2016 | Graham | G06F 3/0488 |
| | | | 713/323 |
| 2017/0150260 A1 * | 5/2017 | Hashimoto | B06B 1/0238 |
| 2021/0141508 A1 | 5/2021 | Rosenberg et al. | |
| 2021/0183215 A1 | 6/2021 | Carter et al. | |
| 2021/0240267 A1 | 8/2021 | Gajiwala et al. | |
| 2021/0342018 A1 | 11/2021 | Dearsley et al. | |
| 2023/0186738 A1 * | 6/2023 | Yokoyama | G08B 6/00 |
| | | | 340/407.1 |

\* cited by examiner

*Primary Examiner* — Benyam Haile
(74) *Attorney, Agent, or Firm* — Brownstein Hyatt Farber Schreck, LLP (57) ABSTRACT

An electronic device provides a haptic waveform component of a haptic notification at a full low power headroom followed by an audio waveform component of the haptic notification at the full low power headroom. In this way, the amplitude of each of the waveform components may be maximized as much as is allowed by the device's low power constraints while the proximity of the waveform components in time may still cause them to be perceived by people as provided at more or less the same time. As a result, the haptic notification may be more salient while staying within the device's low power constraints.

20 Claims, 8 Drawing Sheets

LOW-POWER SALIENT HAPTICS

CROSS-REFERENCE TO RELATED APPLICATION

This application is a nonprovisional and claims the benefit under 35 U.S.C. § 119(e) of U.S. Provisional Patent Application No. 63/343,812, filed May 19, 2022, the contents of which are incorporated herein by reference as if fully disclosed herein.

FIELD

The described embodiments relate generally to haptics. More particularly, the present embodiments relate to low-power salient haptics.

BACKGROUND

Electronic devices (such as cellular telephones, smart watches, tablet computing devices, laptop computing devices, desktop computing devices, fitness monitors, displays, printers, networking devices, and so on) may provide notifications to people in a variety of different ways. These notifications may be audio notifications, visual notifications, haptic (relating to the sense of touch) notifications, and so on. For example, an electronic device may provide a haptic notification by providing a vibration to a person using a linear actuator or other vibration device.

Though haptic notification relates to the sense of touch, haptic notifications typically involve a haptic output (such as a low frequency vibratory output) as well as an audio output (such as a high frequency audio output). The haptic output and audio output components of a haptic notification are typically provided approximately simultaneously and are generally perceived by the user as a combined, single haptic notification.

SUMMARY

The present disclosure relates to low-power salient haptics. Upon determining to provide a haptic notification, a device may provide a haptic waveform component of the haptic notification at a full low power headroom followed by an audio waveform component of the haptic notification at the full low power headroom. In this way, the amplitude of each of the waveform components may be maximized as much as is allowed by the device's low power constraints while the proximity of the waveform components in time may still cause them to be perceived by people as provided at more or less the same time. As a result, the haptic notification may be more salient while staying within the device's low power constraints.

In various embodiments, an electronic device includes a speaker, an input device, a haptic device, a non-transitory storage medium that stores instructions, and a processor. The processor executes the instructions to determine to provide a haptic notification in response to activation of the input device, provide a haptic waveform component of the haptic notification at a full low power headroom, and provide an audio waveform component of the haptic notification at the full low power headroom after or prior to providing the haptic waveform component of the haptic notification.

In some examples, the processor provides the haptic waveform component to the haptic device. In a number of examples, the processor provides the audio waveform component to the haptic device. In various examples, the processor provides the audio waveform component to the speaker.

In a number of examples, the haptic waveform component increases in frequency from a first time to a second time. In various examples, the audio waveform component decreases in amplitude from a first time to a second time. In a number of examples, the haptic notification simulates a click of the input device.

In some embodiments, an electronic device includes a non-transitory storage medium that stores instructions and a processor. The processor executes the instructions to determine to provide a haptic notification while operating in a low power mode, provide a haptic waveform component of the haptic notification, and separately provide an audio waveform component of the haptic notification.

In a number of examples, the processor uses at least double as much power when providing an additional haptic notification while operating in a higher power mode than when providing the haptic notification while operating in the low power mode. In various examples, the processor provides an additional haptic notification by providing a combination of the haptic waveform component of the haptic notification and the audio waveform component of the haptic notification while operating in a higher power mode.

In a number of examples, the processor provides the audio waveform component of the haptic notification following providing the haptic waveform component of the haptic notification. In some examples, the processor provides the audio waveform component and the haptic waveform component to a same output device. In a number of examples, the haptic waveform component is a sine wave. In various examples, the audio waveform component is jagged.

In a number of embodiments, a method includes operating an electronic device in a higher power mode, providing a first haptic notification that includes a haptic waveform component and an audio waveform component that overlap, switching to a low power mode, and providing a second haptic notification that includes the haptic waveform component followed or preceded by the audio waveform component.

In some examples, the first haptic notification is provided for a shorter duration than the second haptic notification. In various examples, the audio waveform component is provided close enough in time to the haptic waveform component that a human user perceives output of the audio waveform component and the haptic waveform component as simultaneous.

In a number of examples, the switching to the low power mode is performed in response to determining that a battery is below a threshold charge level. In some examples, the haptic waveform component has a frequency of below 500 hertz. In various examples, the audio waveform component is provided for a shorter duration than the haptic waveform component.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Providing haptic notifications that include a haptic output and an audio output that are provided more or less simultaneously may require a great deal of power. A low power device or a device operating in a low power state (such as a mobile computing device that enters a low power state where some operations may be limited when charge of a battery that powers the mobile computing device drops below a threshold charge level, such as 20%, 25%, and so on) may require that power consumption stay below a low power headroom (i.e., the device's low power constraints). Providing haptic notifications that include haptic output and an audio output that are provided more or less simultaneously may require more power than the low power headroom.

One solution to the above is to reduce the amplitude of the haptic output and the audio output of the haptic notification to fit within the low power headroom. However, reducing the amplitude in this way also reduces the salience, or the ability of people to perceive the haptic notification.

Another solution to the above is to switch the device operating in a low power state to a higher power state prior to providing the haptic notification, providing the haptic notification including the haptic output and the audio output more or less simultaneously, and then switching back to the low power state. However, it may not be possible to switch states in this way. For example, the device may not have sufficient battery charge to switch to the higher power mode. By way of another example, the device may not be configured to operate in a higher power mode.

The following disclosure relates to low-power salient haptics. Upon determining to provide a haptic notification, a device may provide a haptic waveform component of the haptic notification at a full low power headroom followed by an audio waveform component of the haptic notification at the full low power headroom. In this way, the amplitude of each of the waveform components may be maximized as much as is allowed by the device's low power constraints while the proximity of the waveform components in time may still cause them to be perceived by people as provided at more or less the same time. As a result, the haptic notification may be more salient while staying within the device's low power constraints.

These and other embodiments are discussed below with reference to FIGS. 1A-4. However, those skilled in the art will readily appreciate that the detailed description given herein with respect to these Figures is for explanatory purposes only and should not be construed as limiting.

Figure 1A:
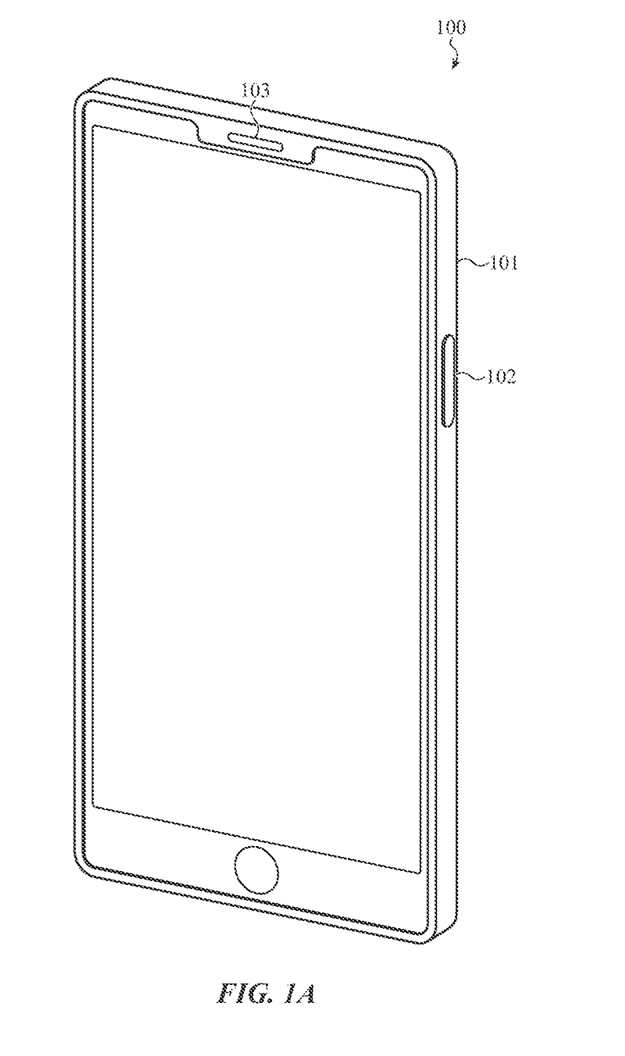
FIG. 1A depicts an electronic device that provides low-power salient haptics.

FIG. 1A depicts an electronic device 100 that provides low-power salient haptics. The electronic device 100 may be operable to provide one or more haptic notifications. The electronic device 100 may also be operable to operate in one or more power modes (such as a low power mode, a lower power mode, a normal power mode, a higher power mode, a high power mode, and so on). For example, the electronic device 100 may be operable to operate in a low power mode and a higher power mode (which may be a normal mode and/or any other mode that utilizes more power than the low power mode, just as the low power mode may be any mode that utilizes less power than the higher power mode). While operating in the low power mode, the electronic device 100 may be constrained to not consume more power than a low power headroom.

Upon determining to provide a haptic notification while operating in the low power mode, the electronic device 100 may provide a haptic waveform component of the haptic notification at a full low power headroom followed by an audio waveform component of the haptic notification at the full low power headroom. In this way, the amplitude of each of the waveform components may be maximized as much as is allowed by the electronic device's low power constraints while the proximity of the waveform components in time may still cause them to be perceived by people as provided at more or less the same time. As a result, the haptic notification may be more salient while staying within the electronic device's low power constraints.

For example, the electronic device 100 may include a button 102 and/or other input device and/or other mechanism and a housing 101. The electronic device 100 may be configured to provide haptic notifications in response to detecting a push of the button 102. Upon determining to provide the haptic notification in response to detecting a push of the button 102 while operating in the low power mode, the electronic device 100 may provide a haptic waveform component of the haptic notification to a haptic device (discussed in more detail below) (which may be coupled to the button 102 so as to provide one or more vibrations via the button) at a full low power headroom followed by an audio waveform component of the haptic notification to the haptic device and/or another device (such as a speaker device coupled to a speaker port 103) at a full low power headroom. The haptic notification may be perceptible to the user as a single "click" associated with the press of the button 102. Various configurations are possible and contemplated without departing from the scope of the present disclosure.

Although the above is described in the context of the electronic device 100 being configured to provide haptic notifications in response to detecting a push of the button 102, it is understood that this is an example. In various implementations, the electronic device 100 may be configured to provide haptic notifications in response to events other than the push of the button 102. Various configurations are possible and contemplated without departing from the scope of the present disclosure.

In some examples, the electronic device 100 may be operable to provide a combination of the haptic waveform component and the audio waveform component (such as where the haptic waveform component and the audio waveform component overlap in time) when providing haptic notifications and not operating in the low power mode. In other examples, the electronic device 100 may be operable to provide a combination of another haptic waveform component and another audio waveform component (such as where the haptic waveform component and the audio waveform component overlap in time) and/or one or more of the haptic waveform component and another audio waveform component and another haptic waveform component and the audio waveform component when providing haptic notifications and not operating in the low power mode. In yet other examples, the electronic device 100 may provide a haptic waveform component of the haptic notification followed by an audio waveform component of the haptic notification when providing haptic notifications and not operating in the low power mode. Various configurations are possible and contemplated without departing from the scope of the present disclosure.

In various examples, the electronic device 100 may have a power constraint of approximately 5-6 watts when operating in a higher power mode while having a power constraint (or low power headroom) of approximately 1.5 watts while operating in a low power mode. As such, the low power mode may have a power constraint of approximately a quarter of the higher power mode. However, it is understood that this is an example and that other power constraints and/or power modes are possible and contemplated without departing from the scope of the present disclosure.

In some examples, one or more vibrations associated with the haptic waveform component may be between approximately 3 and 500 hertz. However, it is understood that this is an example. In other implementations, one or more vibrations associated with the haptic waveform component may be outside approximately 3 and 500 hertz. Various configurations are possible and contemplated without departing from the scope of the present disclosure.

Although the above paragraphs describe the electronic device 100 providing a haptic waveform component of the haptic notification at a full low power headroom followed by an audio waveform component of the haptic notification at the full low power headroom, there may be implementations where the full low power headroom may not be desired. Further, even in implementations discussed above, the audio waveform may decay over time and thus may not use the full low power headroom. Regardless, by generating one output after the other, in various implementations, the sum of the maximum power outputs of the waveforms may exceed the full low power headroom. Further, in various implementations, the sum of the maximum power of both waveforms may fit within the full low power headroom but, to conserve power, the two waveforms may still be provided one after another. In a number of implementations, this may even be done in a higher power mode.

Although the electronic device 100 is illustrated as a mobile telephone, it is understood that this is an example. In other implementations, the electronic device 100 may be any kind of electronic device without departing from the scope of the present disclosure. Examples of such devices may include, but are not limited to, mobile electronic devices, wearable electronic devices, laptop computing devices, tablet computing devices, desktop computing devices, printers, displays, speakers, networking devices, ear buds, remote control devices, digital media players, and so on. Various configurations are possible and contemplated without departing from the scope of the present disclosure.

Figure 1B:
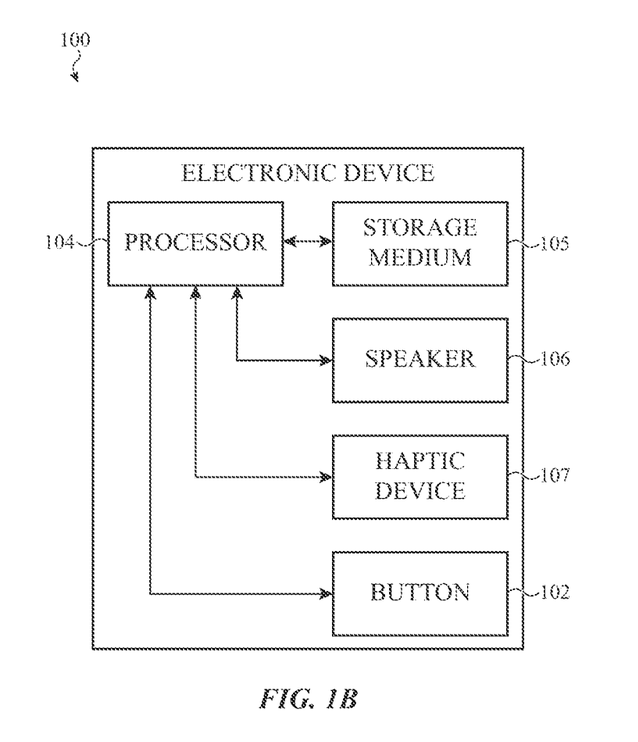
FIG. 1B is a block diagram illustrating example relationships between example components that may be used to implement the electronic device of FIG. 1A.

FIG. 1B is a block diagram illustrating example relationships between example components that may be used to implement the electronic device 100 of FIG. 1A. The electronic device 100 may include one or more processors 104 and/or other processing units and/or controllers, one or more buttons 102, speakers 106, haptic devices 107, and one or more non-transitory storage media 105 (which may take the form of, but is not limited to, a magnetic storage medium; optical storage medium; magneto-optical storage medium; read only memory; random access memory; erasable programmable memory; flash memory; and so on). The processor 104 may execute one or more instructions stored in the storage medium 105 to perform various functions, such as switching between and/or operating in one or more power modes (such as a low power mode, a lower power mode, a normal power mode, a higher power mode, a high power mode, and so on), determining to provide one or more haptic notifications, providing one or more haptic notifications, and so on.

However, it is understood that this is an example. In other implementations, other configurations of the same, similar, and/or different components may be used without departing from the scope of the present disclosure.

By way of example, FIG. 1B illustrates both a speaker 106 and a haptic device 107. However, it is understood that this is an example. In some implementations, the speaker 106 may be used to provide both audio and vibratory outputs. As such, the haptic device 107 may be omitted. Various configurations are possible and contemplated without departing from the scope of the present disclosure.

Figure 1C:
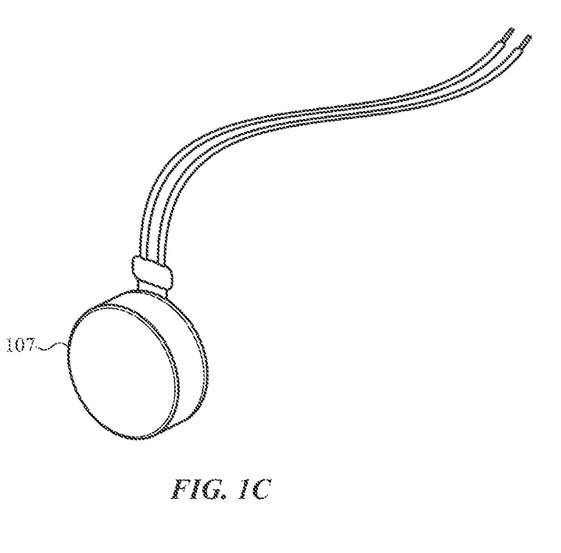
FIG. 1C depicts an example haptic device that may be used to implement the electronic device of FIG. 1A.

FIG. 1C depicts an example haptic device 107 that may be used to implement the electronic device of FIG. 1A. As illustrated, the haptic device 107 may be a linear resonant actuator or voice coil that may be operable to move to provide vibrations, audio, and so on. However, it is understood that this is an example and that in other examples the haptic device 107 may be any other kind of haptic device, such as other kinds of linear or non-linear actuators, piezoelectric devices, and so on. Various configurations are possible and contemplated without departing from the scope of the present disclosure.

Figure 1D:
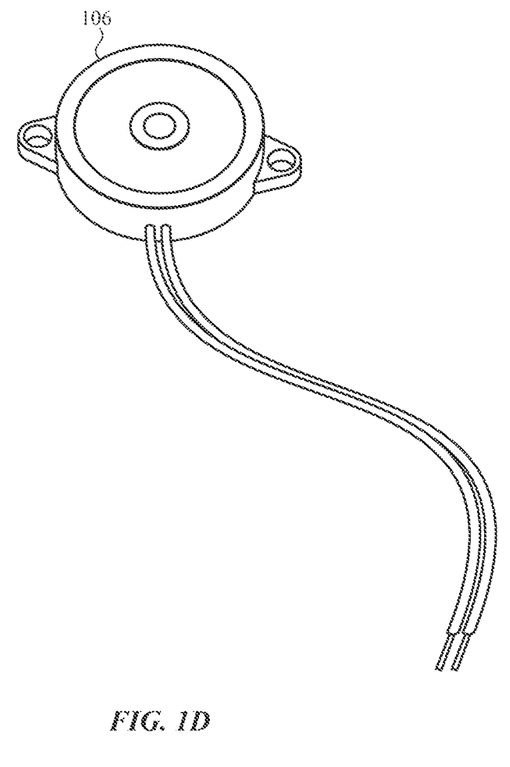
FIG. 1D depicts an example speaker that may be used to implement the electronic device of FIG. 1A.

FIG. 1D depicts an example speaker 106 that may be used to implement the electronic device of FIG. 1A. As illustrated, the speaker 106 may be a piezoelectric speaker that may be operable to produce audio, vibrations, and so on. However, it is understood that this is an example and that in other implementations, other speakers (such as a voice coil speaker) may be used. Various configurations are possible without departing from the scope of the present disclosure.

Figure 2A:
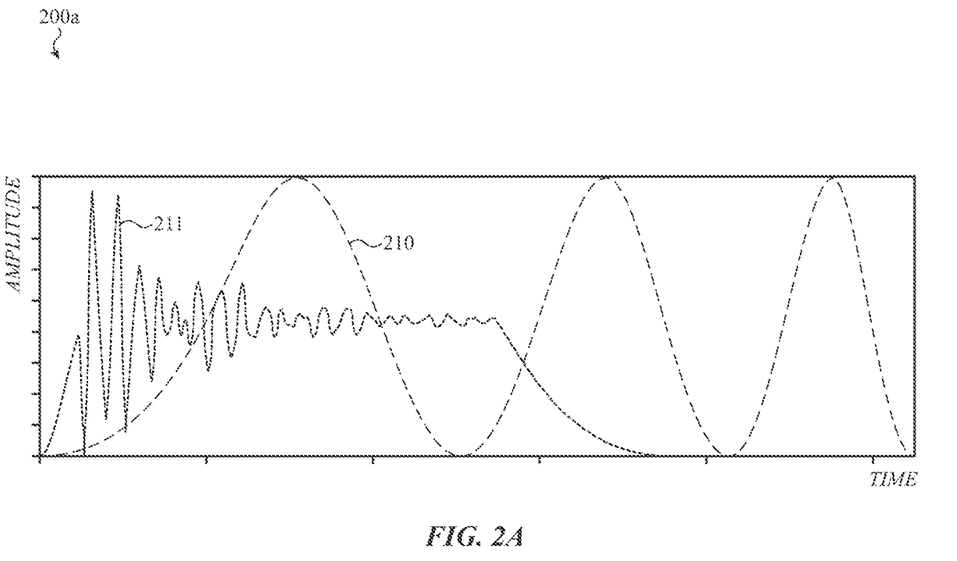
FIG. 2A depicts a first haptic notification waveform that includes a haptic waveform component and an audio waveform component that overlap.

FIG. 2A depicts a first haptic notification waveform 200*a* that includes a haptic waveform component and an audio waveform component that overlap. As such, the haptic waveform component of the first haptic notification waveform 200a and the audio waveform component of the first haptic notification waveform 200a may be provided at more or less the same time. In some examples, an electronic device (such as the electronic device 100 of FIG. 1A) may provide the first haptic notification waveform 200a upon determining to provide a haptic notification when operating in a higher power mode.

Figure 2B:
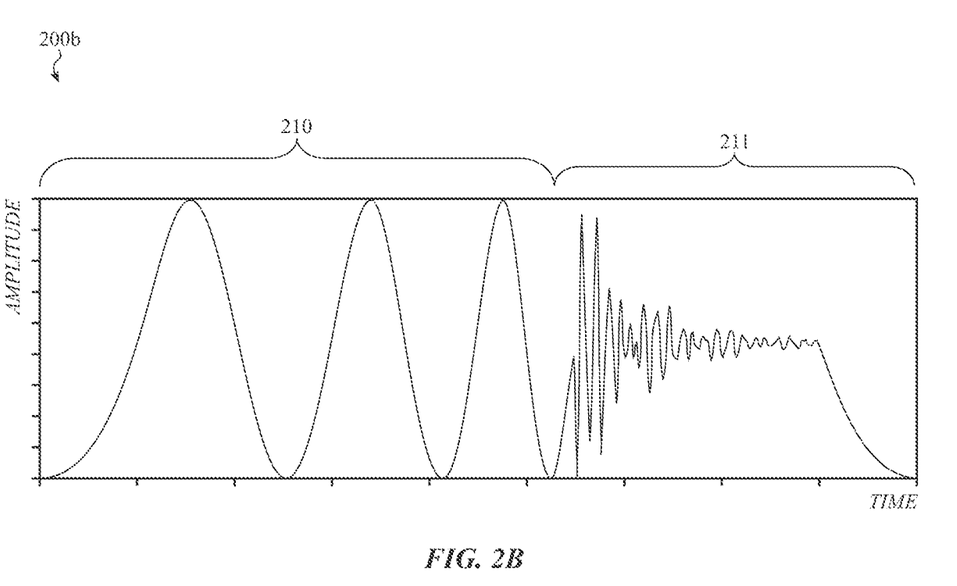
FIG. 2B depicts a second haptic notification waveform that includes a haptic waveform component and an audio waveform component that are separate in time.

FIG. 2B depicts a second haptic notification waveform 200b that includes a haptic waveform component 210 and an audio waveform component 211 that are separate in time. In other words, the audio waveform component 211 follows the haptic waveform component 210 such that the haptic waveform component 210 and the audio waveform component 211 do not overlap. However, the haptic waveform component 210 and the audio waveform component 211 may be provided close enough in time that they are perceived by a person as part of the same haptic notification, such as a button and/or other click.

As shown, the second haptic notification waveform 200b of FIG. 2B has a longer duration in time than the first haptic notification waveform 200a of FIG. 2A. As also shown, the haptic waveform component 210 of FIG. 2B may have a longer duration in time than the audio waveform component 211 of FIG. 2B.

The haptic waveform component 210 may be a sine wave that has a smooth curve. The haptic waveform component 210 may increase in frequency over time from a beginning to an end. The haptic waveform component 210 may maintain its amplitude throughout.

The audio waveform component 211 may be jagged. A waveform may be jagged if it has a time-varying amplitude, such as an amplitude that decays, an amplitude that increases and decreases at different times, an amplitude that increases and decreases within a generally decaying envelope, and so on. A sawtooth waveform may be an example of a waveform that is jagged. The audio waveform component 211 may start with a high amplitude that matches the amplitude of the haptic waveform component 210, but may then decay before trailing off at the end.

Figure 2C:
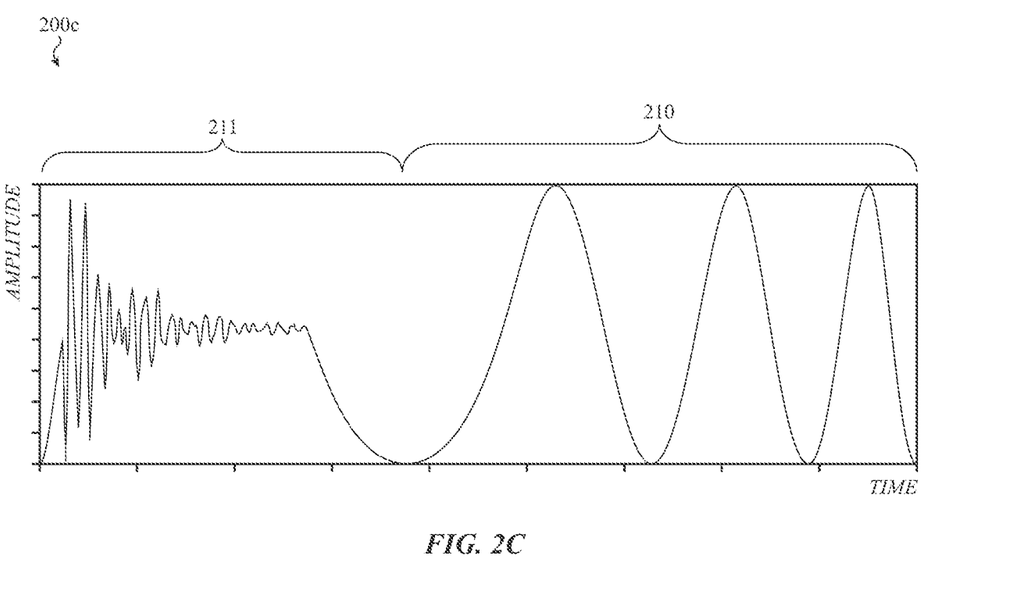
FIG. 2C depicts a third haptic notification waveform that includes a haptic waveform component and an audio waveform component that are separate in time.

FIG. 2C depicts a third haptic notification waveform 200c that includes a haptic waveform component 210 and an audio waveform component 211 that, like the second haptic notification waveform 200b of FIG. 2B, are separate in time. However, unlike the second haptic notification waveform 200b of FIG. 2B, the audio waveform component 211 precedes the haptic waveform component 210 such that the haptic waveform component 210 and the audio waveform component 211 do not overlap. However, the haptic waveform component 210 and the audio waveform component 211 may be provided close enough in time that they are perceived by a person as part of the same haptic notification, such as a button and/or other click.

Figure 3A:
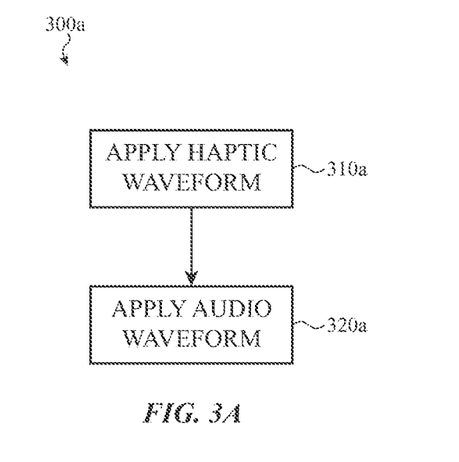
FIG. 3A is a flow chart illustrating a first method for providing low-power salient haptics. This method may be performed by the electronic device of FIG. 1A.

FIG. 3A is a flow chart illustrating a first method 300a for providing low-power salient haptics. This method 300a may be performed by the electronic device 100 of FIG. 1A, for example.

At operation 310a, an electronic device (such as the electronic device 100 of FIG. 1A) may apply and/or provide a haptic waveform component of a haptic notification. The electronic device may provide the haptic waveform component of the haptic notification to a haptic device, such as a linear actuator.

At operation 320a, the electronic device may apply and/or provide an audio waveform component of the haptic notification. The haptic notification may simulate a click of a button or other input device.

The electronic device may apply and/or provide the audio waveform component of the haptic notification to the haptic device, to the speaker device, and/or to another device. The electronic device may apply and/or provide the audio waveform component of the haptic notification after applying and/or providing the haptic waveform component of the haptic notification such that the two are separate, that the audio waveform component of the haptic notification follows the haptic waveform component of the haptic notification, and so on. However, the electronic device may apply and/or provide the audio waveform component of the haptic notification close enough in time to applying and/or providing the haptic waveform component of the haptic notification that the audio waveform component of the haptic notification and the haptic waveform component of the haptic notification are perceived by a human user as part of the same haptic output. In some implementations, this may mean applying the audio waveform immediately after the haptic waveform, without a quiescent period between the waveforms, as soon as practical if one device is used to provide both the haptic and audio waveforms, and so on. Various configurations are possible and contemplated without departing from the scope of the present disclosure.

Although the example method 300a is illustrated and described as including particular operations performed in a particular order, it is understood that this is an example. In various implementations, various orders of the same, similar, and/or different operations may be performed without departing from the scope of the present disclosure.

For example, the method 300a may include one or more additional operations not shown and described. By way of illustration, in some examples, the method 300a may include the additional operation of determining to provide the haptic notification. Various configurations are possible and contemplated without departing from the scope of the present disclosure.

Figure 3B:
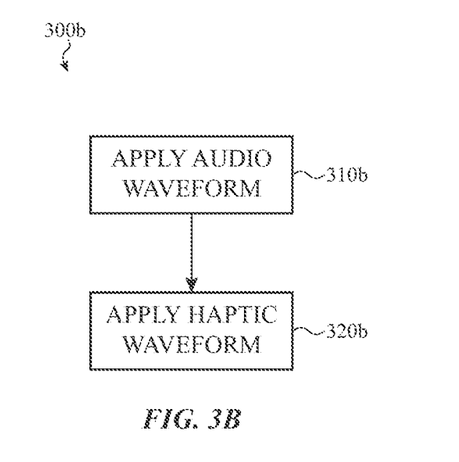
FIG. 3B is a flow chart illustrating a second method for providing low-power salient haptics. This method may be performed by the electronic device of FIG. 1A.

FIG. 3B is a flow chart illustrating a second method 300b for providing low-power salient haptics. This method 300b may be performed by the electronic device 100 of FIG. 1A, for example.

At operation 310b, an electronic device (such as the electronic device 100 of FIG. 1A) may apply and/or provide an audio waveform component of a haptic notification. The haptic notification may simulate a click of a button or other input device.

At operation 320b, the electronic device may apply and/or provide a haptic waveform component of the haptic notification. The electronic device may provide the haptic waveform component of the haptic notification to a haptic device, such as a linear actuator.

The electronic device may apply and/or provide the audio waveform component of the haptic notification to the haptic device, to the speaker device, and/or to another device. The electronic device may apply and/or provide the audio waveform component of the haptic notification after applying and/or providing the haptic waveform component of the haptic notification such that the two are separate, that the audio waveform component of the haptic notification follows the haptic waveform component of the haptic notification, and so on. However, the electronic device may apply and/or provide the audio waveform component of the haptic notification close enough in time to applying and/or providing the haptic waveform component of the haptic notification that the audio waveform component of the haptic notification and the haptic waveform component of the haptic notification are perceived by a human user as part of the same haptic output. In some implementations, this may mean applying the audio waveform immediately after the haptic waveform, without a quiescent period between the waveforms, as soon as practical if one device is used to provide both the haptic and audio waveforms, and so on. Various configurations are possible and contemplated without departing from the scope of the present disclosure.

Although the example method 300b is illustrated and described as including particular operations performed in a particular order, it is understood that this is an example. In various implementations, various orders of the same, similar, and/or different operations may be performed without departing from the scope of the present disclosure.

For example, the method 300b may include one or more additional operations not shown and described. By way of illustration, in some examples, the method 300a may include the additional operation of determining to provide the haptic notification. Various configurations are possible and contemplated without departing from the scope of the present disclosure.

Figure 4:
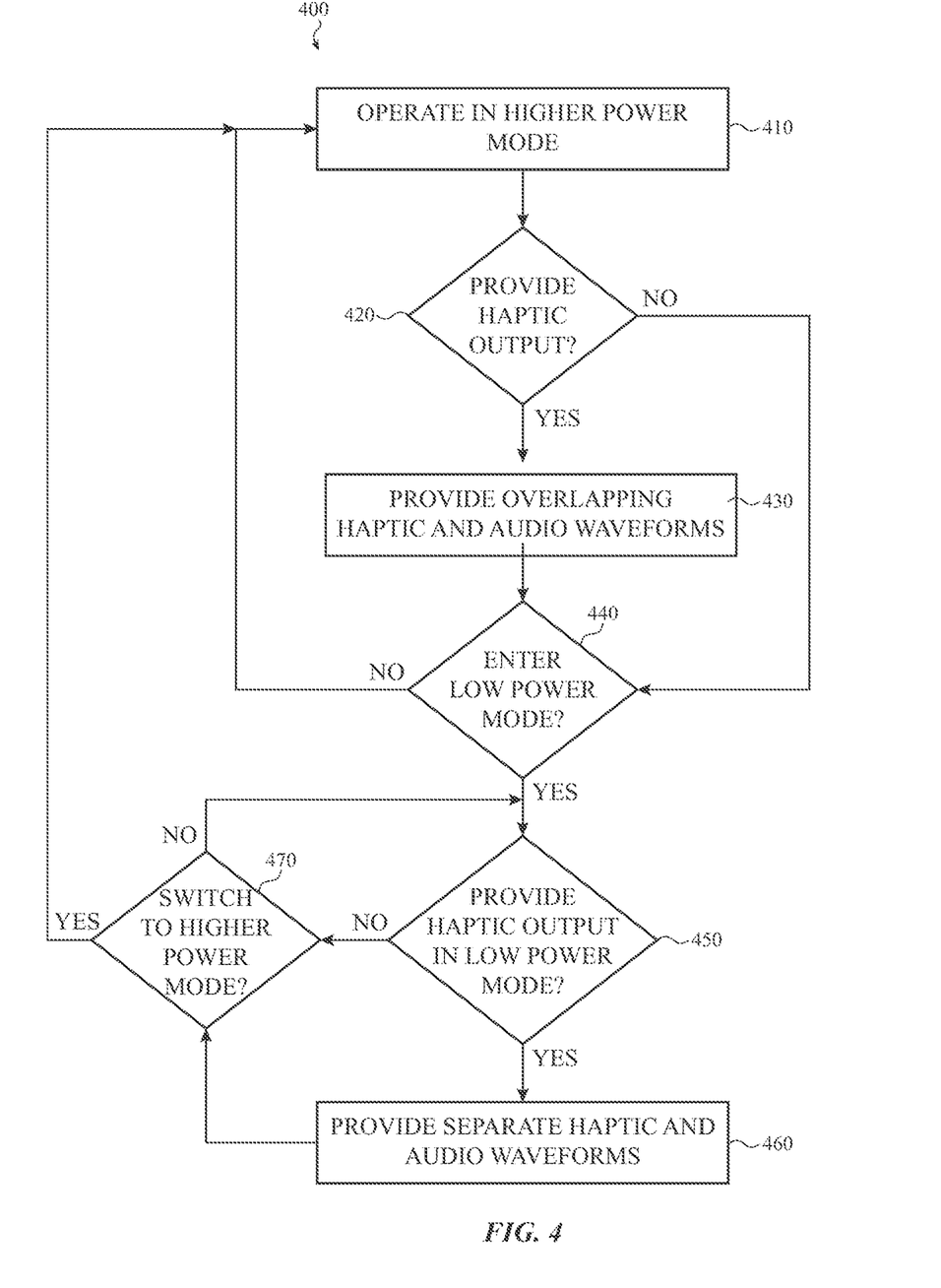
FIG. 4 is a flow chart illustrating a third method for providing low-power salient haptics. This method may be performed by the electronic device of FIG. 1A.

FIG. 4 is a flow chart illustrating a third method 400 for providing low-power salient haptics. This method 400 may be performed by the electronic device 100 of FIG. 1A, for example.

At operation 410, an electronic device (such as the electronic device 100 of FIG. 1A) may operate in a higher power mode. The higher power mode may consume more power than when the electronic device operates in a low power mode.

At operation 420, the electronic device may determine whether or not to provide one or more haptic outputs and/or notifications. For example, the electronic device may determine to provide a haptic output and/or notification in response to detecting the press of a button, a touch to a touch screen, and so on. If so, the flow may proceed to operation 430. Otherwise, the flow may proceed to operation 440.

At operation 430, where a determination is made to provide one or more haptic outputs and/or notifications, the electronic device may provide overlapping haptic and audio waveform components of the haptic output and/or notification. The haptic and audio waveform components of the haptic output and/or notification may be provided at more or less the same time. The flow may then proceed to operation 440.

At operation 440, the electronic device may determine whether or not to enter the low power mode. In some examples, the electronic device may determine to enter the low power mode when a battery is below a threshold charge level, such as 20%, 25%, and so on. If not, the flow may return to operation 410 where the electronic device may continue to operate in the higher power mode. Otherwise, the electronic device may switch to the low power mode before the flow proceeds to operation 450.

At operation 450, the electronic device may determine whether or not to provide one or more haptic outputs and/or notifications while operating in the low power mode. For example, the electronic device may determine to provide a haptic output and/or notification while operating in the low power mode in response to detecting the press of a button, a touch to a touch screen, and so on. If so, the flow may proceed to operation 460. Otherwise, the flow may proceed to operation 470.

At operation 460, the electronic device may provide separate haptic and audio waveform components of the haptic output and/or notification. The haptic and audio waveform components of the haptic output and/or notification may be the same haptic and audio waveform components provided in operation 430. Alternatively, one or more of the haptic and audio waveform components of the haptic output and/or notification may be different from the haptic and audio waveform components provided in operation 430. The haptic and audio waveform components of the haptic output and/or notification may be provided such that the audio waveform component of the haptic output and/or notification follows the haptic waveform component of the haptic output and/or notification. However, the haptic and audio waveform components of the haptic output and/or notification may be provided close enough in time that they are perceived by a human user as part of the same haptic output and/or notification. The flow may then proceed to operation 470.

At operation 470, the electronic device may determine whether or not to switch to the higher power mode. In some examples, the electronic device may determine to switch to the higher power mode when a battery is at or above a threshold charge level, such as 20%, 25%, and so on. If so, the flow may return to operation 410 where the electronic device may switch to operate in the higher power mode. Otherwise, the electronic device may return to operation 450 where the electronic device may again determine whether or not to provide one or more haptic outputs and/or notifications while operating in the low power mode.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 illustrates and describes the electronic device operating in either a higher power mode or a low power mode. However, it is understood that this is an example. In various implementations, the electronic device may be operable to operate in one or more other modes (such as a lower power mode, a higher power mode, a normal power mode, and so on) without departing from the scope of the present disclosure. In such implementations, the electronic device may provide haptic output and/or notifications in such other modes like the electronic device does in the low power mode and/or the higher power mode, different from the electronic device does in the low power mode and/or the higher power mode, and so on. Various configurations are possible and contemplated without departing from the scope of the present disclosure.

In various implementations, an electronic device may include a speaker, an input device, a haptic device, a non-transitory storage medium that stores instructions, and a processor. The processor may execute the instructions to determine to provide a haptic notification in response to activation of the input device, provide a haptic waveform component of the haptic notification at a full low power headroom, and provide an audio waveform component of the haptic notification at the full low power headroom after or prior to providing the haptic waveform component of the haptic notification.

In some examples, the processor may provide the haptic waveform component to the haptic device. In a number of examples, the processor may provide the audio waveform component to the haptic device. In various examples, the processor may provide the audio waveform component to the speaker.

In a number of examples, the haptic waveform component may increase in frequency from a first time to a second time. In various examples, the audio waveform component may decrease in amplitude from a first time to a second time. In a number of examples, the haptic notification may simulate a click of the input device.

In some implementations, an electronic device may include a non-transitory storage medium that stores instructions and a processor. The processor may execute the instructions to determine to provide a haptic notification while operating in a low power mode, provide a haptic waveform component of the haptic notification, and separately provide an audio waveform component of the haptic notification.

In a number of examples, the processor may use at least double as much power when providing an additional haptic notification while operating in a higher power mode than when providing the haptic notification while operating in the low power mode. In various examples, the processor may provide an additional haptic notification by providing a combination of the haptic waveform component of the haptic notification and the audio waveform component of the haptic notification while operating in a higher power mode.

In a number of examples, the processor may provide the audio waveform component of the haptic notification following providing the haptic waveform component of the haptic notification. In some examples, the processor may provide the audio waveform component and the haptic waveform component to a same output device. In a number of examples, the haptic waveform component may include a sine wave. In various examples, the audio waveform component may be jagged.

In a number of implementations, a method may include operating an electronic device in a higher power mode, providing a first haptic notification that includes a haptic waveform component and an audio waveform component that overlap, switching to a low power mode, and providing a second haptic notification that includes the haptic waveform component followed or preceded by the audio waveform component.

In some examples, the first haptic notification may be provided for a shorter duration than the second haptic notification. In various examples, the audio waveform component may be provided close enough in time to the haptic waveform component that a human user perceives output of the audio waveform component and the haptic waveform component as simultaneous.

In a number of examples, the switching to the low power mode may be performed in response to determining that a battery is below a threshold charge level. In some examples, the haptic waveform component may have a frequency of below 500 hertz. In various examples, the audio waveform component may be provided for a shorter duration than the haptic waveform component.

As described above and illustrated in the accompanying figures, the present disclosure relates to low-power salient haptics. Upon determining to provide a haptic notification, a device may provide a haptic waveform component of the haptic notification at a full low power headroom followed by an audio waveform component of the haptic notification at the full low power headroom. In this way, the amplitude of each of the waveform components may be maximized as much as is allowed by the device's low power constraints while the proximity of the waveform components in time may still cause them to be perceived by people as provided at more or less the same time. As a result, the haptic notification may be more salient while staying within the device's low power constraints.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   a speaker;
   an input device;
   a haptic device;
   a non-transitory storage medium that stores instructions; and
   a processor that executes the instructions to:
      determine to provide a haptic notification in response to activation of the input device;
      provide a haptic waveform component of the haptic notification at a full low power headroom; and
      provide an audio waveform component of the haptic notification at the full low power headroom after or prior to providing the haptic waveform component of the haptic notification.

2. The electronic device of claim 1, wherein the processor provides the haptic waveform component to the haptic device.

3. The electronic device of claim 1, wherein the processor provides the audio waveform component to the haptic device.

4. The electronic device of claim 1, wherein the processor provides the audio waveform component to the speaker.

5. The electronic device of claim 1, wherein the haptic waveform component increases in frequency from a first time to a second time.

6. The electronic device of claim 1, wherein the audio waveform component decreases in amplitude from a first time to a second time.

7. The electronic device of claim 1, wherein the haptic notification simulates a click of the input device.

8. An electronic device, comprising:
a non-transitory storage medium that stores instructions; and
a processor that executes the instructions to:
determine to provide a haptic notification while operating in a low power mode;
provide a haptic waveform component of the haptic notification; and
separately provide an audio waveform component of the haptic notification wherein the processor uses at least double as much power when providing an additional haptic notification while operating in a higher power mode than when providing the haptic notification while operating in the low power mode.

9. The electronic device of claim 8, wherein the higher power mode is a normal mode.

10. The electronic device of claim 8, wherein the processor provides an additional haptic notification by providing a combination of the haptic waveform component of the haptic notification and the audio waveform component of the haptic notification while operating in a higher power mode.

11. The electronic device of claim 8, wherein the processor provides the audio waveform component of the haptic notification following providing the haptic waveform component of the haptic notification.

12. The electronic device of claim 8, wherein the processor provides the audio waveform component and the haptic waveform component to a same output device.

13. The electronic device of claim 8, wherein the haptic waveform component comprises a sine wave.

14. The electronic device of claim 8, wherein the audio waveform component is jagged.

15. A method, comprising:
operating an electronic device in a higher power mode;
providing a first haptic notification that includes a haptic waveform component and an audio waveform component that overlap;
switching to a low power mode; and
providing a second haptic notification that includes the haptic waveform component followed or preceded by the audio waveform component wherein the first haptic notification is provided for a shorter duration than the second haptic notification.

16. The method of claim 15, further comprising providing a third haptic notification that includes the haptic waveform component followed or preceded by the audio waveform component while operating in the higher power mode.

17. The method of claim 15, wherein the switching to the low power mode is performed in response to determining that a battery is below a threshold charge level.

18. The method of claim 15, wherein the haptic waveform component has a frequency of below 500 hertz.

19. A method, comprising:
operating an electronic device in a higher power mode;
providing a first haptic notification that includes a haptic waveform component and an audio waveform component that overlap;
switching to a low power mode; and
providing a second haptic notification that includes the haptic waveform component followed or preceded by the audio waveform component wherein the audio waveform component is provided close enough in time to the haptic waveform component that a human user perceives output of the audio waveform component and the haptic waveform component as simultaneous.

20. A method, comprising:
operating an electronic device in a higher power mode;
providing a first haptic notification that includes a haptic waveform component and an audio waveform component that overlap;
switching to a low power mode; and
providing a second haptic notification that includes the haptic waveform component followed or preceded by the audio waveform component wherein the audio waveform component is provided for a shorter duration than the haptic waveform component.

* * * * *